DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 734

T884,016

PROCESS FOR IMPROVING THE UNIFORMITY OF CRIMPED CONTINUOUS ACRYLIC TOW

Imre Mirko Jonkoff, Camden, S.C., assignor to E. I. du Pont de Nemours and Company, Wilmington, Del.

Filed June 29, 1970, Ser. No. 50,897
Int. Cl. D01g *1/06, 5/00*
U.S. Cl. 19—66
No Drawing. 8 Pages Specification

A process for improving the uniformity of crimped, continuous acrylic filament tow. The tow is forwarded into contact with at least one (preferably two) grooved applicator surface under sufficient tension to separate the filaments. The grooved applicator surface has outlets in the roots and/or crests of the grooves which are connected to an internal conduit. While in contact with the applicator surface, the filaments are heated at a temperature between about 95° C. and 160° C. by uniformly passing steam from the applicator surface onto the filaments. The steam pressure is preferably about 5 to 30 p.s.i.g. and the tow is preferably forwarded at speeds of about 125 to 175 yards per minute.

The process results in better tow quality as is indicated by a reduction in the static properties of the tow and a reduction in the crimp index of the fibers. This improvement provides for better tow processability into sliver (e.g., on a "Turbo Stapler"), a more uniform sliver (e.g., fewer defects) and better yarn uniformity.